United States Patent [19]

Hashimoto et al.

[11] Patent Number: 5,460,888

[45] Date of Patent: Oct. 24, 1995

[54] MULTI-LAYERED OPTICAL FILM

[75] Inventors: Sigeru Hashimoto; Akihiko Yokoyama, both of Yokohama, Japan

[73] Assignee: Canon Kabushiki Kaisah, Tokyo, Japan

[21] Appl. No.: 307,491

[22] Filed: Sep. 16, 1994

Related U.S. Application Data

[63] Continuation of Ser. No. 186, Jan. 4, 1993, abandoned.

[30] Foreign Application Priority Data

Jan. 10, 1992 [JP] Japan .................. 4-003183

[51] Int. Cl.⁶ .................................................. G03C 1/825
[52] U.S. Cl. .................. 428/432; 428/212; 428/701; 428/702; 359/580; 359/586
[58] Field of Search .................... 428/212, 432, 428/701, 702; 359/580, 586

[56] References Cited

U.S. PATENT DOCUMENTS 3,858,965  1/1975  Sumita .................... 359/359
4,628,005  12/1986  Ito et al. .................. 428/432
4,805,989  2/1989  Nakajima ................. 359/359

FOREIGN PATENT DOCUMENTS 2049738  2/1977  Germany.
63-131101  6/1988  Japan.

*Primary Examiner*—A. A. Turner
*Attorney, Agent, or Firm*—Fitzpatrick, Cella, Harper & Scinto

[57] ABSTRACT

Alternating films consisting of alternations of high refractive index films and low refractive index films are provided on a transparent substrate such that the high refractive index film is adjacent to the substrate. The low refractive index films are composed of $Al_2O_3$. The high refractive index films are composed of at least a component selected from a group consisting of $TiO_2$, $Ta_2O_5$, $HfO_2$, $ZrO_2$, $Nb_2O_5$, mixture thereof and modified substances thereof.

5 Claims, 4 Drawing Sheets

MULTI-LAYERED OPTICAL FILM

This application is a continuation of application Ser. No. 08/000,186 filed Jan. 4, 1993, now abandoned.

BACKGROUND OF THE INVENTION

1. Field of the Invention

The present invention relates to a multi-layered optical film, and more particularly a multi-layered optical film with excellent stability of optical characteristics in a function of time.

2. Related Background Art

In optical elements, the surface reflection reduces the transmittance of the optical system and increases the light not contributing to the imaging, thereby lowering the image contrast. For this reason, an antireflection film is provided on the surface of various optical elements, in order to reduce the surface reflection. Also in the field of optical elements there is already known a beam splitter (light intensity splitting element) for splitting the incident light into a reflected light and a transmitted light with a desired ratio of light intensities. Such optical thin film is usually formed as evaporated films based on metal oxides, and is laminated as a combination of films of a low refractive index and those of a high refractive index. The metal oxide constituting each layer of such multi-layered optical thin film is required to have a desired refractive index, to be optically homogeneous, to be free from absorption thus showing excellent transparency, and to be stable in optical characteristics over time.

For the high refractive index film in such multi-layered optical film, there is widely employed an evaporation film, composed of at least a component selected from a group consisting of $TiO_2$, $Ta_2O_5$, $ZrO_2$, $HfO_2$, $Nb_2O_5$, mixtures thereof and modified substances thereof. Also for the low refractive index film there is employed $SiO_2$ film in consideration of the refractive index and other properties.

However, such multi-layered optical film, formed with the high refractive index films composed of at least a component selected from a group consisting of $TiO_2$, $Ta_2O_5$, $ZrO_2$, $HfO_2$, $Nb_2O_5$, mixtures and modified substance thereof, and with the low refractive index films composed of $SiO_2$, has been associated, when deposited on a substrate of which temperature cannot be made sufficiently high at the film formation, such as a resin substrate, with drawbacks of shift of optical characteristics toward the longer wavelength side over time, and of decrease of the effect of the multi-layered film, due to significant changes as a function of time in the refractive index of the component films.

SUMMARY OF THE INVENTION

In consideration of the foregoing, the object of the present invention is to provide a multi-layered antireflective film having no change as a function of time in the optical characteristics, even when the films are evaporated at a low temperature.

The above-mentioned object can be attained, according to the present invention, by a multi-layered optical thin film composed of high refractive index films and low refractive index films combined on a transparent substrate, wherein the low refractive index film adjacent to the high refractive index films is composed of $Al_2O_3$, thereby completely or almost completely avoiding any significant change as a function of time in the optical characteristics. Stated differently, each high refractive index film in the multi-layered optical film is sandwiched between $Al_2O_3$ films or $Al_2O_3$ film and the transparent substrate. In case $SiO_2$ is used in consideration of the optical characteristics or the mechanical strength, it is preferably laminated between $Al_2O_3$ film, or, as an outermost layer, on an $Al_2O_3$ layer.

The high refractive index film to be employed in the present invention is composed of at least a component selected from a group consisting of $TiO_2$, $Ta_2O_5$, $HfO_2$, $ZrO_2$, $Nb_2O_5$, mixtures and modified substrances thereof, in consideration of the optical characteristics (refractive index and low absorption), mechanical strength and cost. Such high refractive index films are selected according to the wavelength and circumstances at which the optical element is used. In general, in the ultraviolet region, there is employed at least a component selected from a group consisting of $HfO_2$ and $ZrO_2$, and, in the visible wavelength region, there is employed at least a component selected from a group consisting of $TiO_2$, $Ta_2O_5$, $ZrO_2$, $Nb_2O_5$, mixtures and modified substances thereof.

The multi-layered optical film of the present invention may be formed by various known methods, such as vacuum evaporation, ion plating and sputtering.

The thickness and the number of films of the multi-layered optical film may vary according to the desired optical characteristics, but the effect of the present invention is not affected by the film thickness or the number of films as long as the above-mentioned configuration of films is satisfied. Consequently the lower limit of the film thickness is defined from the view point of film thickness control, and the upper limit is defined by the optical characteristics.

DETAILED DESCRIPTION OF THE PREFERRED EMBODIMENTS

Figure 1:
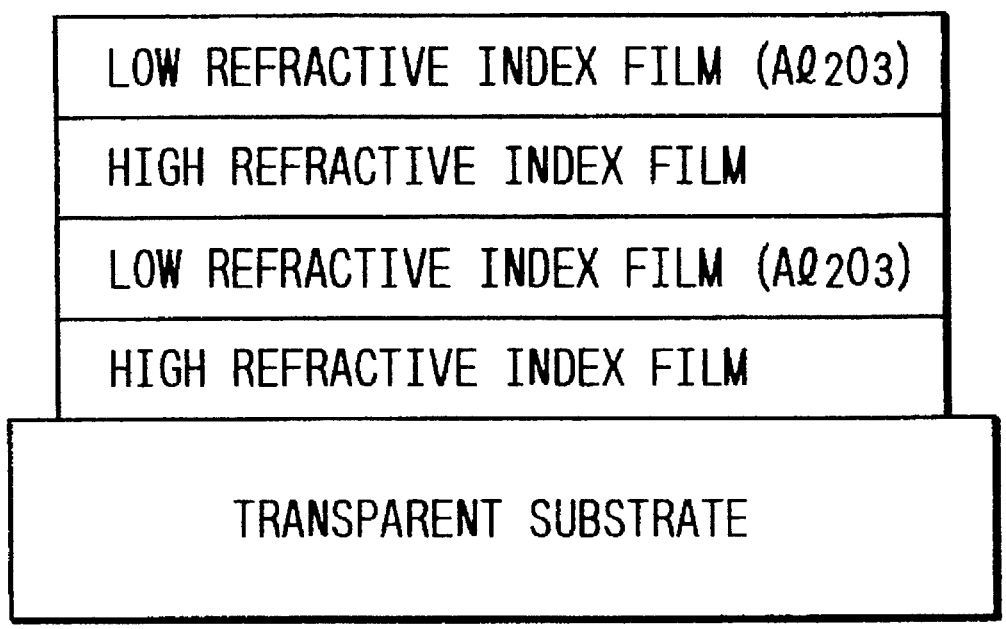
FIG. 1 is a view showing the configuration of the multi-layered optical film of the present invention.

The multi-layered optical film of the present invention is composed, as shown in FIG. 1, of high refractive index films and low refractive index films combined on a transparent substrate, and is featured by a fact that said low refractive index film, adjacent to the high refractive index films is composed of $Al_2O_3$. Adjacent to the substrate, there is provided a high refractive index film. In said multi-layered optical film, the high refractive index films are composed of at least a component selected from a group consisting of $TiO_2$, $Ta_2O_5$, $HfO_2$, $ZrO_2$, $Nb_2O_5$, mixtures and modified substances thereof.

The transparent substrate in the present invention is a translucent substrate composed for example of glass or resinous substance.

In the following there are shown specific embodiments of the film configuration of the present invention.

[EMBODIMENT 1]

An antireflective film for the visible spectral region was formed, with the configuration shown in Table 1, on a lens substrate. An $SiO_2$ film was provided, for the purpose of antireflection, on the $Al_2O_3$ film.

TABLE 1

$\lambda_1 = 535$ nm; incident angle 0°

| | Material | Ref. index (n) | Optical thickness (nd) |
|---|---|---|---|
| Entrance medium | Air | 1.00 | |
| 1st layer | $SiO_2$ | 1.46 | $0.193\ \lambda_1$ |
| 2nd layer | $Al_2O_3$ | 1.62 | $0.095\ \lambda_1$ |
| 3rd layer | $Ta_2O_5$ | 2.04 | $0.178\ \lambda_1$ |
| 4th layer | $Al_2O_3$ | 1.62 | $0.121\ \lambda_1$ |
| 5th layer | $Ta_2O_5$ | 2.04 | $0.075\ \lambda_1$ |
| Exit medium (substrate) | PMMA | 1.49 | |

[EMBODIMENT 2]

A film was formed as in the embodiment 1, with the configuration shown in Table 2. An $SiO_2$ film was formed for antireflection, on $Al_2O_3$ film.

TABLE 2

$\lambda_1 = 535$ nm; incident angle 0°

| | Material | Ref. index (n) | Optical thickness (nd) |
|---|---|---|---|
| Entrance medium | Air | 1.00 | |
| 1st layer | $SiO_2$ | 1.46 | $0.193\ \lambda_1$ |
| 2nd layer | $Al_2O_3$ | 1.62 | $0.095\ \lambda_1$ |
| 3rd layer | $ZrO_2$—$Nb_2O_5$ mixture | 2.05 | $0.178\ \lambda_1$ |
| 4th layer | $Al_2O_3$ | 1.62 | $0.120\ \lambda_1$ |
| 5th layer | $ZrO_2$—$Nb_2O_5$ mixture | 2.05 | $0.077\ \lambda_1$ |
| Exit medium (substrate) | PMMA | 1.49 | |

[REFERENCE EXAMPLE 1]

A film was formed as in the embodiment 1, with the configuration shown in Table 3. An $SiO_2$ film was provided for antireflection, on the $Al_2O_3$ film.

TABLE 3

$\lambda_1 = 535$ nm; incident angle 0°

| | Material | Ref. index (n) | Optical thickness (nd) |
|---|---|---|---|
| Entrance medium | Air | 1.00 | |
| 1st layer | $SiO_2$ | 1.46 | $0.200\ \lambda_1$ |
| 2nd layer | $Al_2O_3$ | 1.62 | $0.077\ \lambda_1$ |
| 3rd layer | $Ta_2O_5$ | 2.04 | $0.221\ \lambda_1$ |
| 4th layer | $SiO_2$ | 1.46 | $0.067\ \lambda_1$ |
| 5th layer | $Ta_2O_5$ | 2.04 | $0.101\ \lambda_1$ |
| Exit medium (substrate) | PMMA | 1.49 | |

Figure 2:
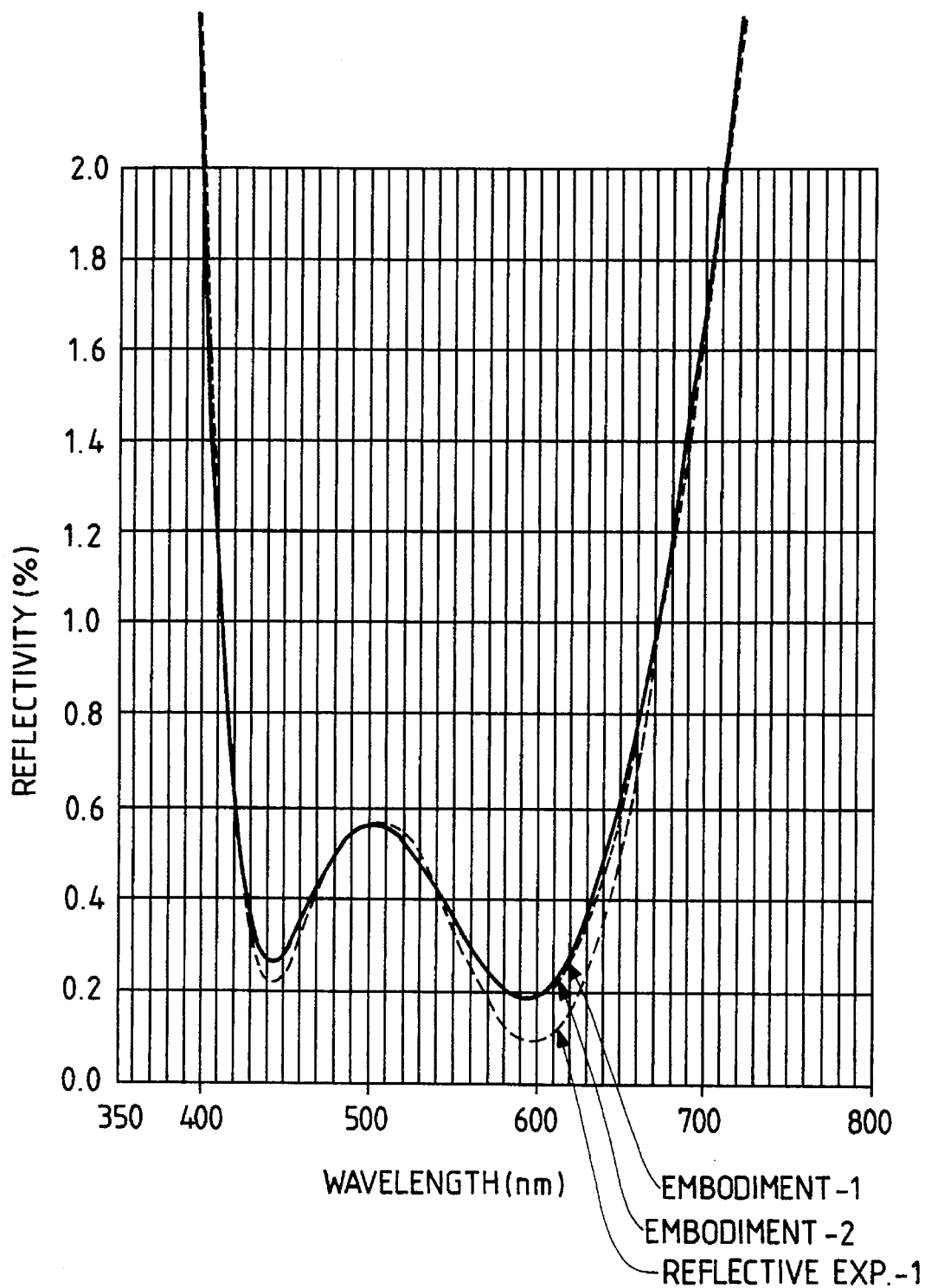
FIG. 2 is a chart showing the antireflective characteristics (spectral characteristics) of the optical elements obtained in embodiments 1, 2 and reference example 1.

The antireflective characteristics (spectral characteristics) of the optical elements obtained in the embodiments 1, 2 and in the reference example 1 are shown in FIG. 2.

The optical elements obtained in the embodiments 1, 2 and in the reference example 1 were left standing under the conditions of a temperature 60° C. and a relative humidity of 90% for 100 hours, and the change in the antireflective characteristics was evaluated. The obtained results are shown in Table 4.

TABLE 4

| | Change in reflectance at 500 nm | Wavelength shift |
|---|---|---|
| Embodiment 1 | no change | no change |
| Embodiment 2 | no change | no change |
| Ref. ex. 1 | change observed (increase 0.5%) | +10 nm |

[EMBODIMENT 3]

An antireflective film for ultraviolet region was formed on a lens substrate, with the configuration shown in Table 5. An $SiO_2$ film was formed for the purpose of antireflection, on the $Al_2O_3$ film.

TABLE 5

$\lambda_1 = 248$ nm; incident angle 0°

| | Material | Ref. index (n) | Optical thickness (nd) |
|---|---|---|---|
| Entrance medium | Air | 1.00 | |
| 1st layer | $SiO_2$ | 1.52 | $0.234\ \lambda_1$ |
| 2nd layer | $Al_2O_3$ | 1.69 | $0.060\ \lambda_1$ |
| 3rd layer | $HfO_2$ | 2.16 | $0.145\ \lambda_1$ |
| 4th layer | $Al_2O_3$ | 1.69 | $0.278\ \lambda_1$ |
| Exit medium (substrate) | synthetic quartz | 1.51 | |

[REFERENCE EXAMPLE 2]

A film was formed in the same manner as in the Embodiment 3, with the configuration shown in Table 6. An $SiO_2$ film was formed for the purpose of antireflection. on $Al_2O_3$ film.

TABLE 6

$\lambda_1 = 248$ nm; incident angle 0°

| | Material | Ref. index (n) | Optical thickness (nd) |
|---|---|---|---|
| Entrance medium | Air | 1.00 | |
| 1st layer | $SiO_2$ | 1.52 | $0.282\ \lambda_1$ |
| 2nd layer | $HfO_2$ | 2.16 | $0.125\ \lambda_1$ |
| 3rd layer | $SiO_2$ | 1.52 | $0.395\ \lambda_1$ |
| 4th layer | $HfO_2$ | 2.16 | $0.460\ \lambda_1$ |
| Exit medium (substrate) | synthetic quartz | 1.52 | |

Figure 3:
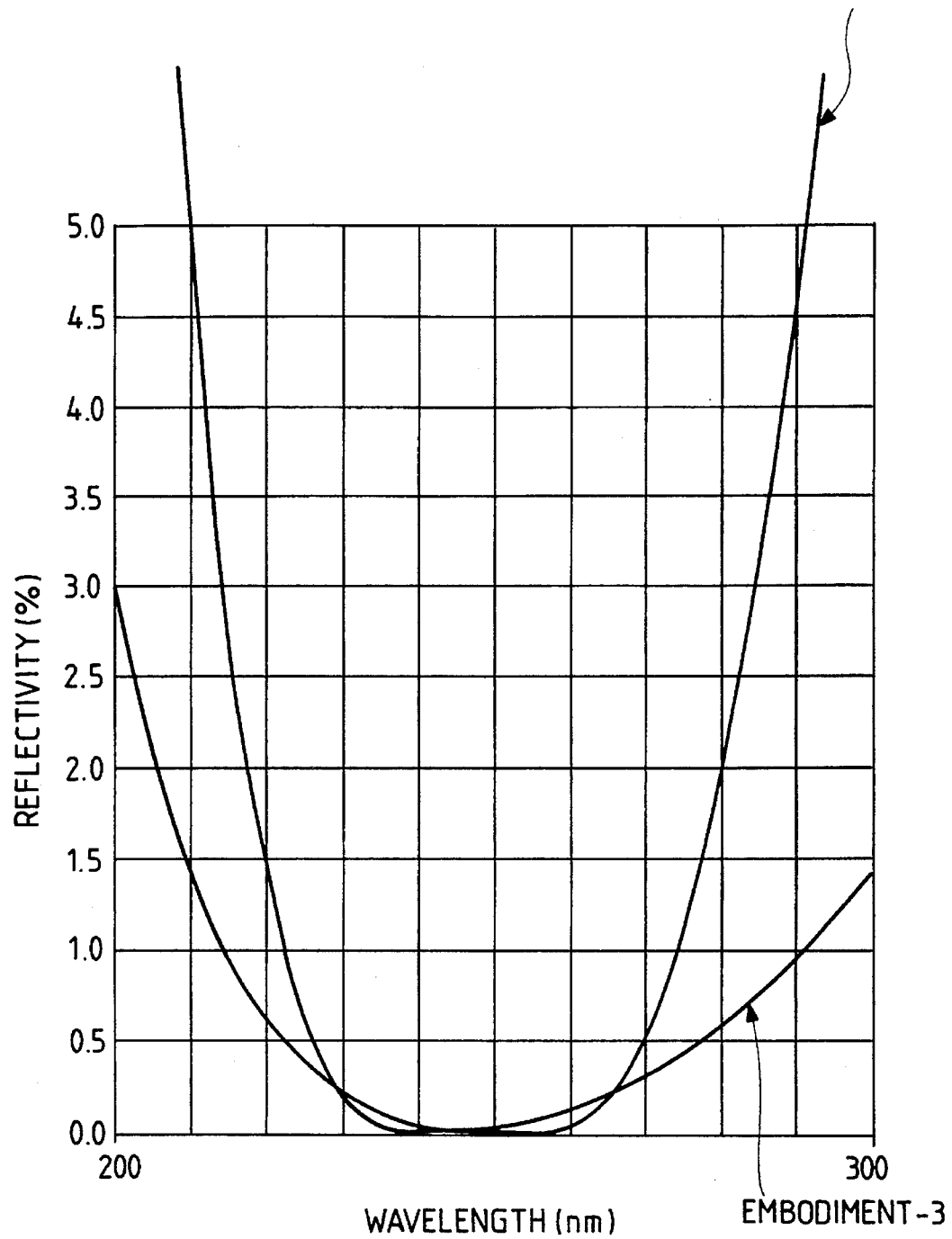
FIG. 3 is a chart showing the antireflective characteristics (spectral characteristics) of the optical elements obtained in embodiment 3 and reference example 2.

The antireflective characteristics (spectral characteristics) of the optical elements obtained in the embodiment 3 and in the reference example 2 are shown in FIG. 3.

Then, the optical elements obtained in the embodiment 3 and in the reference example 2 were left standing in the conditions of a temperature of 60° C. and a relative humidity of 90% for 100 hours, and the change in the antireflective characteristics was investigated. The obtained results are shown in Table 7.

TABLE 7

| | Change in reflectance at 248 nm | Wavelength shift |
|---|---|---|
| Embodiment 3 | no change | no change |
| Ref. ex. 2 | change observed (increase 0.2%) | +7 nm |

[EMBODIMENT 4]

A beam splitter (half mirror) for the visible wavelength region was prepared on a substrate with the configuration shown in Table 8.

TABLE 8

$\lambda_1 = 600$ nm; incident angle 45°

| | Material | Ref. index (n) | Optical thickness (nd) |
|---|---|---|---|
| Entrance medium | Air | 1.00 | |
| 1st layer | $Al_2O_3$ | 1.62 | 0.25 $\lambda_1$ |
| 2nd layer | $TiO_2$ | 2.27 | 0.25 $\lambda_1$ |
| 3rd layer | $Al_2O_3$ | 1.62 | 0.25 $\lambda_1$ |
| 4th layer | $TiO_2$ | 2.27 | 0.25 $\lambda_1$ |
| 5th layer | $Al_2O_3$ | 1.62 | 0.25 $\lambda_1$ |
| 6th layer | $TiO_2$ | 2.27 | 0.25 $\lambda_1$ |
| Exit medium (substrate) | PMMA | 1.49 | |

[REFERENCE EXAMPLE 3]

A film was formed in a similar manner as in the embodiment 4, with the configuration shown in Table 9.

TABLE 9

$\lambda_1 = 600$ nm; incident angle 45°

| | Material | Ref. index (n) | Optical thickness (nd) |
|---|---|---|---|
| Entrance medium | Air | 1.00 | |
| 1st layer | $SiO_2$ | 1.46 | 0.25 $\lambda_1$ |
| 2nd layer | $Al_2O_3$ | 1.62 | 0.25 $\lambda_1$ |
| 3rd layer | $SiO_2$ | 1.46 | 0.25 $\lambda_1$ |
| 4th layer | $TiO_2$ | 2.27 | 0.25 $\lambda_1$ |
| 5th layer | $SiO_2$ | 1.46 | 0.25 $\lambda_1$ |
| 6th layer | $TiO_2$ | 2.27 | 0.25 $\lambda_1$ |
| Exit medium (substrate) | PMMA | 1.49 | |

Figure 4:
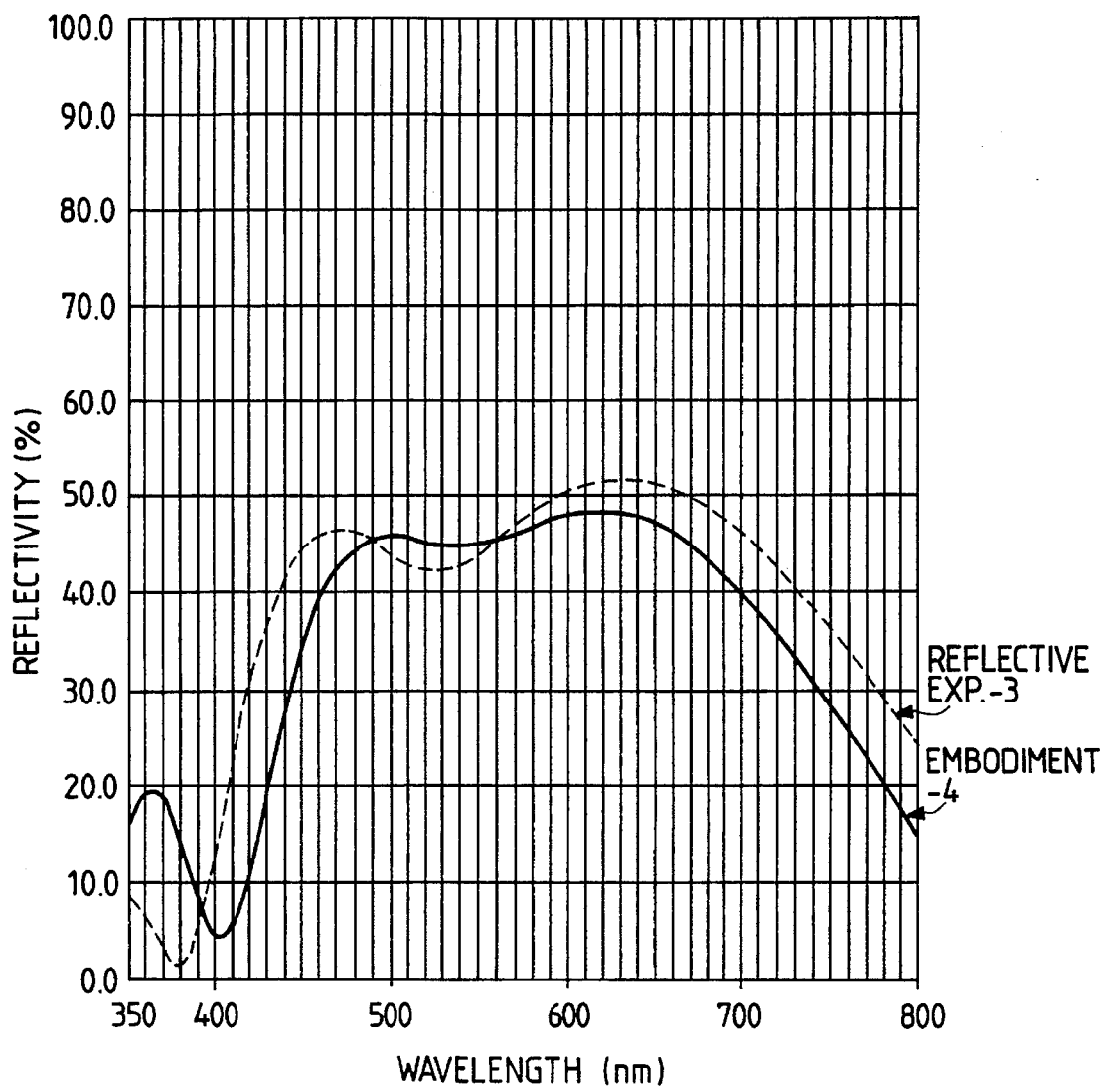
FIG. 4 is a chart showing the antireflective characteristics (spectral characteristics) of the optical elements obtained in embodiment 4 and reference example 3.

The reflective characteristics (spectral characteristics) of the optical elements obtained in the embodiment 4 and the reference example 3 are shown in FIG. 4.

Then, the optical elements obtained in the embodiment 4 and in the reference example 3 were left standing under conditions of a temperature of 60° C. and a relative humidity of 90% for 100 hours, and the change in the reflective characteristics was evaluated. The obtained results are shown in Table 10.

TABLE 10

| | Change in reflectance at 550 nm | Wavelength shift |
|---|---|---|
| Embodiment 4 | no change | no change |
| Ref. ex. 3 | change observed (decrease 5%) | +9 nm |

Also, similar tests were conducted with various combinations and with various ratios of $TiO_2$, $Ta_2O_5$, $HfO_2$, $ZrO_2$, $Nb_2O_5$, mixture and modified substances thereof, and it was confirmed that the time-dependent change in the optical characteristics does not take place by the film configuration of the present invention.

As explained in the foregoing, the multi-layered optical film of the present invention, being composed of high refractive index films and low refractive index films combined on a transparent substrate and being featured by a fact that the low refractive index film adjacent to the high refractive index films is composed of $Al_2O_3$, has the effect of avoiding the time-dependent change of optical characteristics.

What is claimed is:

1. A multi-layered optical thin film comprising:

a transparent substrate;

an optical thin film provided on said transparent substrate, said optical thin film consisting of a multi-layered film in which $HfO_2$ film and $Al_2O_3$ film are alternately laminated, and an antireflective layer as the outermost layer upon said multilayered film.

2. A multi-layered optical thin film according to claim 1, wherein an $Al_2O_3$ film is in contact with said transparent substrate.

3. A multi-layered optical thin film according to claim 1, wherein said outermost antireflective layer is an $SiO_2$ film.

4. A multi-layered optical thin film according to claim 1, wherein said multi-layered film consists of three layers.

5. A multi-layered optical thin film according to claim 1, wherein said multi-layered optical thin film prevents reflection in an ultraviolet region.

* * * * *

UNITED STATES PATENT AND TRADEMARK OFFICE
CERTIFICATE OF CORRECTION

PATENT NO. : 5,460,888
DATED : October 24, 1995
INVENTOR(S) : SIGERU HASHIMOTO, ET AL.

It is certified that error appears in the above-indentified patent and that said Letters Patent is hereby corrected as shown below:

On the title page:

AT [57] ABSTRACT

Line 7, "mixture" should read --mixtures--.

COLUMN 1

Line 42, "substance" should read --substances--.

COLUMN 2

Line 29, "view point" should read --viewpoint--.

COLUMN 4

Line 42, "antireflection." should read --antireflection--.

COLUMN 6

Line 18, "mixture" should read --mixtures--.

Signed and Sealed this

Seventh Day of May, 1996

Attest:

BRUCE LEHMAN

*Attesting Officer*    *Commissioner of Patents and Trademarks*